United States Patent
Sher et al.

(10) Patent No.: US 7,144,513 B2
(45) Date of Patent: Dec. 5, 2006

(54) WATER TREATMENT METHOD IN HIGH CYCLE DISPENSING SYSTEMS FOR SCALE CONTROL

(75) Inventors: Alexander A. Sher, Danbury, CT (US); Richard M. Clarke, New Milford, CT (US); Dominick Damiano, Danbury, CT (US)

(73) Assignee: Nestec S.A., Vevey (CH)

( * ) Notice: Subject to any disclaimer, the term of this patent is extended or adjusted under 35 U.S.C. 154(b) by 208 days.

(21) Appl. No.: 10/839,132

(22) Filed: May 6, 2004

(65) Prior Publication Data
US 2005/0247637 A1    Nov. 10, 2005

(51) Int. Cl.
*C02F 5/08* (2006.01)
(52) U.S. Cl. ............... 210/697; 210/699; 222/1
(58) Field of Classification Search ............... 210/697
See application file for complete search history.

(56) References Cited

U.S. PATENT DOCUMENTS

| | | | | |
|---|---|---|---|---|
| 2,098,431 A | * | 11/1937 | Partridge ............... 252/178 |
| 3,469,696 A | * | 9/1969 | Petrucci et al. ............... 210/97 |
| 3,692,179 A | * | 9/1972 | Moore ............... 210/94 |
| 4,889,041 A | * | 12/1989 | Mahlich et al. ............... 99/285 |
| 5,019,311 A | | 5/1991 | Koslow ............... 264/122 |
| 5,147,722 A | | 9/1992 | Koslow ............... 428/402 |
| 5,314,623 A | | 5/1994 | Heskett ............... 210/638 |
| 5,433,856 A | | 7/1995 | Heskett ............... 210/638 |
| 5,643,444 A | * | 7/1997 | Garrigues et al. ............... 210/136 |
| 6,270,664 B1 | * | 8/2001 | Tsabari ............... 210/206 |
| 6,553,894 B1 | * | 4/2003 | Hamon et al. ............... 99/286 |
| 6,641,727 B1 | * | 11/2003 | Aldred et al. ............... 210/232 |

* cited by examiner

*Primary Examiner*—Peter A. Hruskoci
(74) *Attorney, Agent, or Firm*—Bell, Boyd & Lloyd LLC

(57) ABSTRACT

The invention relates to a method that reduces limestone scale deposit on surfaces and in heating elements, especially, for drinking water in foodservice vending and dispensing machines without affecting the water quality. The method includes passing the water through metal particulate and polyphosphates to remove minerals therefrom and thus reduce scale deposits upon water contacted portions of such machines.

17 Claims, 4 Drawing Sheets

WATER TREATMENT METHOD IN HIGH CYCLE DISPENSING SYSTEMS FOR SCALE CONTROL

FIELD OF THE INVENTION

The invention relates to the water treatment for commercial, industrial and domestic use, particularly for drinking water treatment. More particularly, the invention relates to a method for reducing limestone scale deposit from hard water in high cycle dispensing systems. The invention is particularly applicable in foodservice vending and dispensing equipment or beverage machines with boiler or on-demand heaters.

BACKGROUND OF THE INVENTION

Scaling is one of the most serious problems caused by water hardness, and its is a common one for industrial as well as drinking waters, at home or at restaurants, factories and so on. This particular by-product of heated hard water may put many water-using appliance out of service. It can clog hot water pipes and significantly reduce the heating efficiency of boilers or other water heaters due to deposit on interior surfaces. Moreover, water in most parts of the world is hard and needs to be treated to be of maximum usefulness.

Water quality is also part of efforts of consistent, reliable, vending/dispensing machine operations to deliver a consistent, high quality, safe product. Heating of hard water often leads to scaling, causing a host of problems such as inconsistency in water temperature, quantity of water delivered, eventual breakdowns of the heating units. The heating unit thus requires cleaning and sometimes repair.

Deposit from water formed during the water heating is generally classified either as scale or foulant. Scale is a hard, adherent mineral composition, which usually exists in crystalline form, while foulant is less adherent, tending to be amorphous or non-crystalline.

Scale deposition is a complex crystallization process which occurs when temperature, pH, concentration, flow velocity, pressure or other water conditions are changed. Firstly, an initial scale nucleus or layer is formed which then propagates. The rate of growth is determined by the interaction of several processes (e.g., supersaturating, nucleation, diffusion, chemical reaction and molecular arrangement of scale crystal lattices). Although the solubility limit must be exceeded for scale to form, the rate of scale formation can be controlled by the presence or absence of scale inhibitors and other factors.

Water usually contains a large number of potential scale-causing constituents, such as calcium and magnesium ions, soluble silica compounds, iron salts, and so on. Most calcium and magnesium salts because of their inverse solubility tend to form scale on heat transfer surfaces where the metal surface temperature is higher than the bulk water temperature. Scale usually contains, in order of prevalence, calcium salts (e.g., carbonate, phosphate, sulfate), magnesium hydroxide and salts, silica and silicates, irons oxides and hydroxides, zinc phosphate and hydroxide.

In the field of water treatment for commercial, industrial and domestic use, a number of methods and devices to reduce or eliminate scaling have been proposed, some or all of which have certain undesirable characteristics, drawbacks or disadvantages associated therewith One of the common used techniques for water demineralization is reverse osmosis (RO). In most cases, it is probably the most efficient means of demineralization. In this method, water is pressurized through semi-permeable membrane to go over osmotic pressure (osmotic pressure is present when two liquids of different concentration are separated by a membrane). Another disadvantage of RO system is the cartridge design, which includes a "reject" stream that directs some or most of the water to waste before it can become so concentrated to cause clogging. Thus, ratio between purified and wasted waters can be 1 to 4 and even higher or reverse. Moreover, RO systems produce water relatively slowly; therefore the purified water is often collected in tanks for dispensing later. The capital and operational cost of above process is expensive, However, in certain installations (e.g. industrial and commercial water, large size vending machines), RO system may be of value.

Nanofiltration (NF) also uses semi-permeable membranes to filter water. Because of large overlapping in "pore" size of NF and RO membrane, NF is often considered as lower quality than RO. Further, NF usually removes 60–80% of polyvalent ions while RO—removes 98% and more, depends on membrane quality. A nanofilter, like RO membrane module, is designed with a continuous waste stream and has similar operational and economical disadvantages.

Another commonly used system is ion-exchange. Ions can be selectively removed from water by specific reactions using ion-exchange resins. Nowadays there is a range of ion-exchange resins with varying degrees of selectivity for cations and anions. Thus, during the water treatment, sodium, potassium and/or hydrogen cations are usually used to replace calcium, magnesium, iron and other polyvalent metal ions. However, regardless of the specific ion-exchange resins used, eventually the bed of the resin becomes exhausted and must be regenerated to become useful again or replaced. In addition, calcium replacement with hydrogen ions lowers pH, and both hydrogen and sodium could lead to undesirable taste and quality of water, and e.g. for coffee beverages.

Inorganic scale inhibitors are also commonly used to treat water against scaling. Among all inhibitors of scale formation allowed for drinking water, polyphosphates seem to work the best. One of the advantages of using polyphosphates is their lower effective concentration (usually 1–10 ppm) as compared to sequesters. In addition, polyphosphates are the cheapest anti-scaling agents. However, polyphosphates do not eliminate scaling; they delay deposit formation by slowing down rates of crystallization.

Reported effects of anti-scale magnetic treatment (AMT) of Water appear to vary widely, possibly reflecting variations in water quality. There has been a wide range of mechanisms proposed for how magnetic treatment works, however most of them are unproven. Furthermore, the apparent lack of AMT reproducibility has tended to undermine the credibility of the method.

Various metals, such as zinc, copper, or brass have been employed, in general, to treat water, but typically for other reasons, such as for reduction of levels of contaminants (chlorine, nitrates, hydrosulfide, etc.) in water and/or for bacteristatic/bactericidal functions. When employed in water, reduction of hardness has also been noted.

U.S. Pat. Nos. 5,433,856 and 5,314,623 disclose a fluid treatment method to remove calcium and magnesium. The method for treating water utilizes a bed of finely divided metal particulate matter, which comprises copper (and may/ preferably also contain zinc) or can be in the form of brass alloy, e.g. KDF® material (KDF®-55 powder is the brand name for a granular alloy made of pure, lead-free brass, 50% Cu and 50% Zn). The method is said to lower mineral concentration, in particular, either calcium, magnesium or both, when water is passed through the redox alloy media. In this case, the calcium/magnesium compounds would be accumulated in the metal bed and eventually form a blockage. Moreover, the mechanism of lowering of calcium concentration in treated water is not described or understood.

To summarize known water treatment methods, scale inhibitors are effective in delaying time of deposit formation but do not eliminate scaling. The ion removal methods are most effective in scale prevention because of eliminating scale-causing constituents. However, the cost involved in adding of ions (mostly sodium or hydrogen) as in the case of ion exchange resins, as well as high pressure, an additional storage tank, operating costs in the case of RO, could be an issue.

Thus, there is a need for a method that is more efficient for removing the problem of scale in high cycle dispensing systems such as beverage and/or food dispensers. There is also a need for a low cost method to achieve these results and that is easy to implement. The present invention now satisfies these needs.

SUMMARY OF THE INVENTION

The invention relates to a method that reduces limestone scale deposit on surfaces and in heating elements, especially, for drinking water in foodservice vending and dispensing machines without affecting the water quality. The method comprises passing the water through metal particulates and polyphosphates before water heating to reduce scale deposits in heated or hot water contacted portions of such machines.

Preferably, the metal particulate and polyphosphates comprises at least zinc and polyphosphates. The metal particulate and polyphosphates can be used in a mixture or in separate beds or separate layers. If desired, the metal particulate and polyphosphates can be immobilized on a support layer or be a mass of a finely divided particulate.

The invention also relates to a composite cartridge assembly for treating water to remove minerals therefrom comprising a housing having an untreated water inlet, a treated water outlet and a water permeable bed arranged therebetween. The bed comprises metal particulates and polyphosphates through which water must pass prior to heating for treatment thereof. Preferably, the metal particulates and polyphosphates are present in adjacent layers in the bed.

Another embodiment of the invention relates to a combination comprising a high cycle beverage or food dispensing system that utilizes water for preparing the food or beverage, and the composite cartridge assembly disclosed herein for treating water prior to heating to use in preparing the food or beverage to reduce scale build-up. As noted above, the dispensing system includes water contacting portions such as internal surfaces (tubes, valves, mixing bowls, whipping chamber, etc) and heating elements, and the treated water reduces scale deposits in or upon such heated or hot water contacted portions of the dispensing system.

It was surprisingly found that the metal particulate and polyphosphates in combination provided a synergetic effect on the control and reduction of limestone scaling as compared to metal particulate or polyphosphates used alone.

BRIEF DESCRIPTION OF THE DRAWING FIGURES

DETAILED DESCRIPTION OF THE PREFERRED EMBODIMENTS

Figure 1:
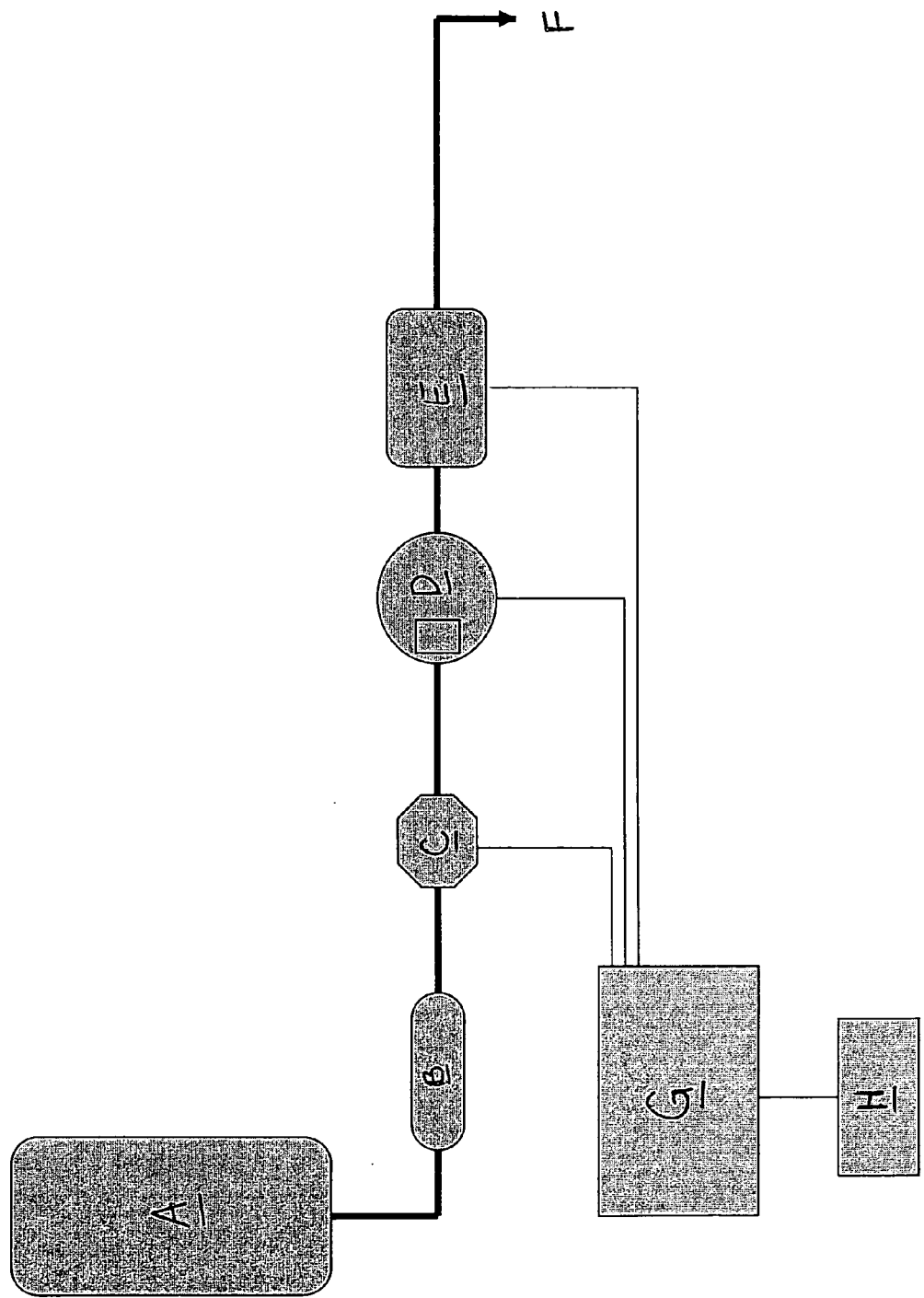
FIG. 1 is a schematic view of a water distribution line of a prototype beverage dispenser that includes a water treatment cartridge according to the present invention.

The present invention generally relates to the water treatment for scale control in hard water, which can be used in boilers, or other heating units, hot pipes for commercial, industrial and domestic uses, particularly for drinking water treatment, especially for use in foodservice vending and dispensing machines with internal mixing surfaces, and boiler or on-demand heating elements or similar components.

It was surprisingly found that the combination of metal particulates, e.g. zinc and copper, and polyphosphates drastically reduces the scale deposit on the internal surfaces of high cycle food or beverage dispensing systems with a synergetic effect compared to the existing descaling methods with metal particulate used alone or polyphosphate used alone.

The metal particulates are preferably chosen among the group consisting of zinc, copper, iron, magnesium, manganese, tin, a mixture and an alloy thereof. The metal or metal combinations used are not limited. The metal particulate comprises at least two different metals; e.g., one being zinc and another being a metal with a higher standard electrode potential such as, preferably, copper. Pairs of metals can be used in a wide range of combinations from 95:5 to 5:95 by weight percent.

Zinc and copper mixtures or alloys are preferred because they are more effective in scale control than other metals or metals combinations and are suitable for applications that utilize drinking water. A zinc and copper alloy such as brass is preferred due to its homogeneous structure which allows a better control of scale than pure metals or mixtures thereof. The preferred ratio when these two metals are used ranges from 75:25 to 25:75, and is most preferably 45:55 to 55:45 by weight percent.

Preferably, the method is carried out to enable a release of metal ions in water in a controlled manner. The release of metal ions is in the order of 0.1 to 50 ppm. In a preferred solution, the metal particulate comprises zinc in an amount effective to deliver of from 0.2 to 20 ppm of zinc ions in water, preferably 0.5 to 8 ppm of zinc ions, most preferably 1 to 5 ppm of zinc ions. The controlled release of metal ions is mainly determined with regard to the total amount of metal particulate, its contact surface with water when water permeates the medium, the water flow rate and the number of cycles expected for the system. Therefore, a skilled artisan is able to determine the suitable dose of metal particulate by experiments in order to ensure a controlled amount of metal ions is continuously released within the preferred ranges.

In the same way, the controlled release of polyphosphate is mainly determined with regard to the amount and size of polyphosphate particles, its contact surface with water when water permeates the medium, the water flow rate and the number of cycles expected for the system. Therefore, a skilled artisan is able to determine the suitable dose of polyphosphate by experiments in order to ensure a controlled amount of polyphosphates ions is continuously released within the preferred ranges. The preferred concentration of polyphosphates released in water is 1 to 10 ppm, and the most preferable concentration is 2 to 4 ppm.

Polyphosphates source that is primarily used in the method can include sodium, potassium, ammonium, lithium, magnesium or calcium salts or acids of polyphosphates, polymetaphosphates, pyrophosphates or phosphonates as well as mixtures thereof. For example, the polyphosphates source can be chosen among any one of a number of acids or salts such as pyrophosphates, trimetaphosphates, tetrapolyphosphates, hexametaphosphates, organo-phosphonates, polyphosphates with various degrees of polymerization or a mixture thereof. The preferred polyphosphate source is metaphosphate salts with a degree of polymerization 6–13. The most preferred is sodium and calcium hexametaphosphates. The salts or acids used are not limited to those with specific phosphorous chain composition or length.

The combination of the metal particulates and polyphosphates, which are the object of the invention, may be formed conveniently by mixing of the components or by forming layers of each of the components; i.e., the metal or metals and polyphosphates. In a first embodiment, the metal particulate and polyphosphates are combined to form a bed where water can permeate through. The metal particulate and polyphosphates are mixed to form a blend or composition which is inserted in a cartridge. The cartridge is sized to accommodate a sufficient amount of the components, to allow the water flow rate and to release the controlled concentration of metal ions in water. In alternate solutions, the metal particulate and polyphosphates are formed in separate layers of each component. The combination of any numbers of layers at any parallel or alternate sequence or order is possible. On the other hand, the metal particulate and polyphosphates can be placed in separate cartridges.

Preferably, the ratio metal particulate to polyphosphates is at a weight ratio of from 95:5 to 5:95, preferably 5.5:1 to 1:1, most preferably 3:1 to 2:1.

The present invention also provides an apparatus containing polyphosphates and metal particulate in combination to treat cold, ambient or tepid water. The water can then be heated in a heater when hot water for a beverage is desired, for example. The water treatment ensures that no scale will permanently deposit on the internal surfaces of the heater or on any surfaces past the heater such as tubing, vanes, nozzles and the like. The method of the invention ensures that no significant scaling will occur for an number of dispensing cycles of more 10,000 and up to 45,000 cycles or more, i.e., under high cycle service conditions. Existing traditional methods using materials such as metals alone or polyphosphates alone have shown that the maximum number of cycles is usually less than 5,000. The increase in the number of cycles results from a synergetic effect in the use of a combination of metal(s) and polyphosphates which was totally unexpected.

FIG. 1 illustrates the overall components of a beverage dispenser according to the invention. The dispenser includes a water supply A which delivers water to at least one water treatment composite cartridge B prior to heating. If desired, the treated water can pass through a flowmeter C and a pump D prior to entering a heater E which raises the temperature of the water to the desired value for preparing a selected beverage. The heated water is discharged at F into a different portion of the dispenser where it is mixed with a beverage forming component to form the beverage. The flowmeter C, pump D and heater E generally would be controlled by a processor or microprocessor G which, when desired for use, is energized by operating an activation switch H to power the dispenser.

Figure 2:
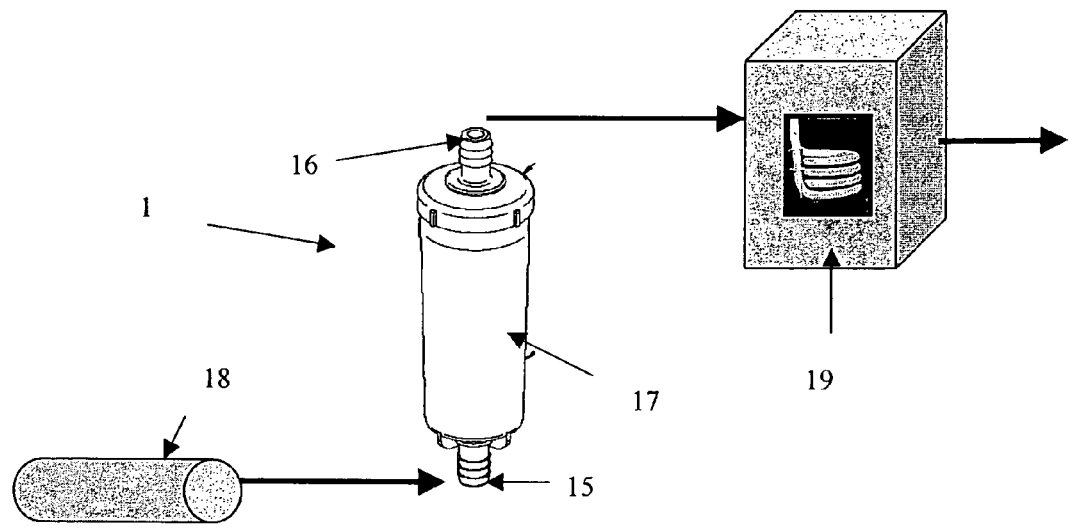
FIG. 2 is a schematic view of a water distribution line of a prototype beverage dispenser that includes a single water treatment cartridge according to the present invention.
Figure 3:
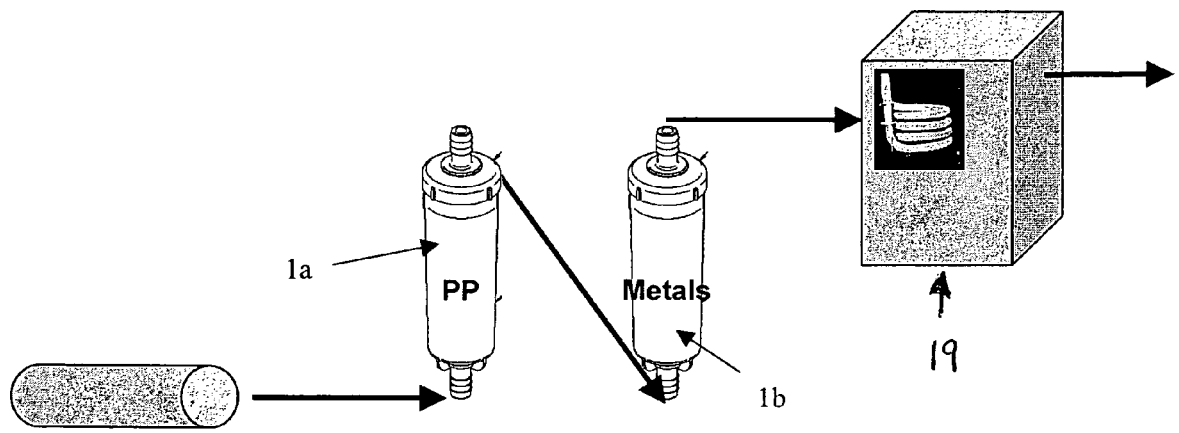
FIG. 3 is a schematic view of a water distribution line of a prototype beverage dispenser that includes water treatment cartridges in series according to the present invention.
Figure 4:
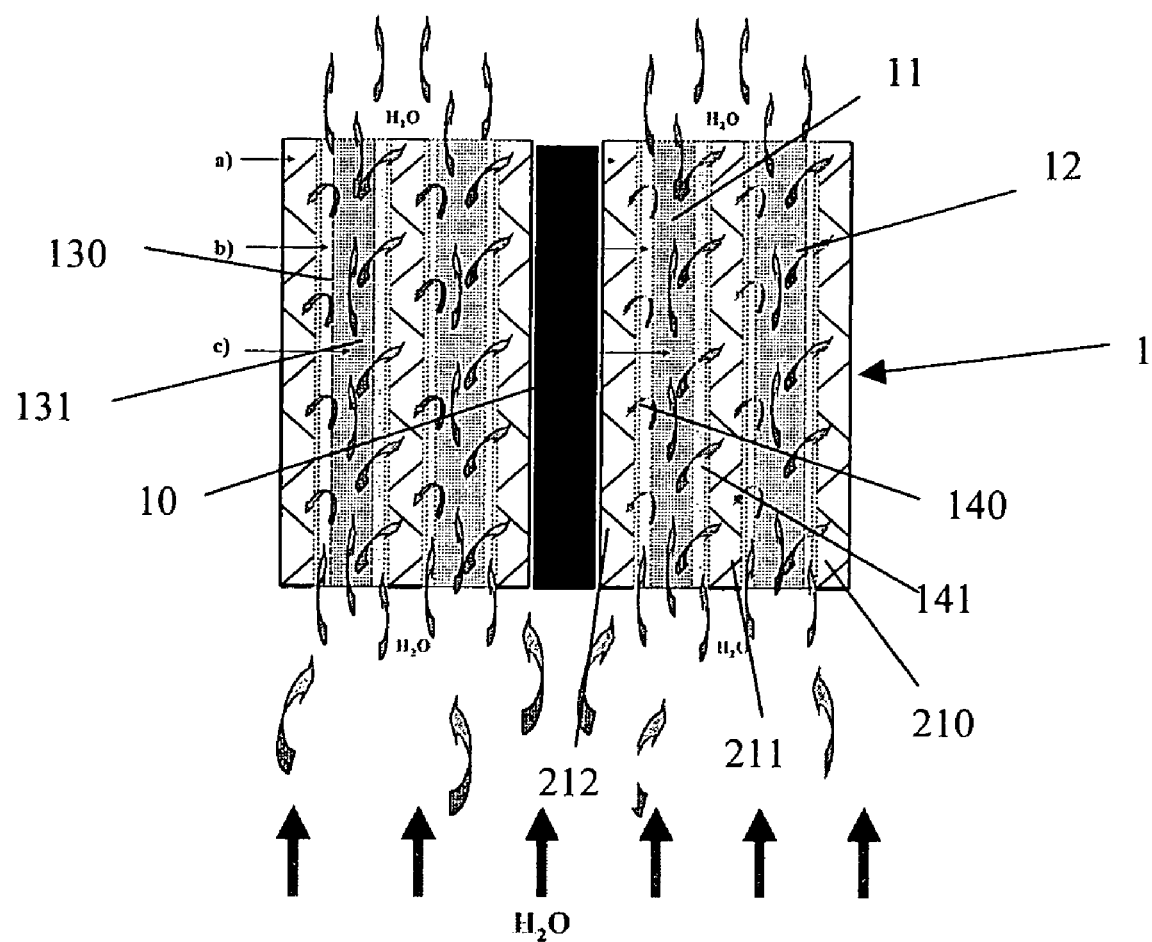
FIG. 4 is a cross-sectional view of a cartridge according to the invention.

FIG. 2 illustrates an exemplary mode of the invention. Typically, the invention is embodied in a cartridge 1 as a container which comprises an inlet 15 and an outlet 16 and water impermeable sidewalls 17. The cartridge holds a bed of metal particulates with polyphosphate crystals. The inlet and outlet are typically positioned at the ends of the cartridge permitting water to flow from a water line 18 and to contact the combination medium. The water exits the cartridge to flow in a heater 19. Another possibility is to use two cartridges as illustrated in FIG. 3; one 1a with the polyphosphates and another one 1b with metal particulates, in series (as shown) or in parallel (not shown).

The particulate mater composition provides a permeability for the desirable water flow. The size of the particulate medium can vary significantly, preferably of from 20 to 10,000 micrometers. The preferred particulate size for most applications ranges from 100 to 3,000 micrometers. Most preferably, the particulate size ranges from 500 to 1,000 micrometers for a water flow rate comprised between 2 and 50 ml/second.

The treating container can be of a variety of shapes and sizes depending upon the desired applications, e.g., the size of the dispensing machine, the water flow rate, the number of cups delivered per day and so on. As an example, the container or cartridge can be in the form of a cylindrical shape having an internal diameter of 1–5 cm and internal length of 3–20 cm enabling to accommodate 20–350 grams of treating medium.

In a preferred embodiment, at least the metal particulate is immobilized in a composite cartridge assembly configured to prevent the particles to compact and favors the water flow through the particles. Preferably, the metal particulate and polyphosphates are both immobilized together in a composite cartridge assembly. In a preferred design, the cartridge assembly comprises a plurality of layers arranged longitudinally along the direction of the water flow; with at least one layer of metal particulates, or metal particulates and polyphosphates, positioned between two support layers of inert porous material. Preferably, two or more layers of metal particulates, or metal particulates and polyphosphates, are taken in sandwich between support layers of inert porous material. Furthermore, the composite cartridge assembly is arranged to favor the water flow through the treating medium by having flow turbulence means consisting of water insoluble material placed adjacent the porous support layers to allow water to pass through it essentially along a tangential direction and which is thus configured to increase turbulence in the particulate layer(s). The flow turbulence means may be formed from a net which is placed externally adjacent the support layers. The net is configured to enable the water flow to traverse tangentially the porous support and layer of particulate but to block or at least render the longitudinal flow through it more difficult. As a result, transverse water flows are generated in addition to the longitudinal water path which so increase the contact with the treating medium.

When particles are immobilized, particle size is preferably limited of from 0.01 to 5 mm in mean diameter, more preferably of from 0.1 to 0.7 mm.

The advantages of immobilizing the metal particulates or combination of metal particulates and polyphosphates are numerous. Small particles because they are point-bound to the polymer network, do not move during water treatment and so the compacting effect is decreased and water blockage is advantageously prevented. Significantly less quantity of treating medium can also be used because the medium can perform at a constant efficiency until almost the physical disappearance of the medium.

FIG. 3 illustrates a preferred mode for immobilizing the particulate material in a cartridge or water treatment container such as that disclosed in U.S. Pat. Nos. 5,019,311 and 5,147,722. The cartridge can be a hollow cylinder 1 with a central core 10, cylindrical layers of metal particulates and polyphosphates 11, 12 which are each immobilized by a pair cylindrical support layers of porous paper 130, 131, 140, 141. Paper could be replaced by thin porous layers of polymeric material. The porosity of the support layers is chosen to maintain the particulate layers in place to prevent the particles from passing therethrough. Surrounding the support layers is a turbulence enhancing means such as nets 210, 211, 212 consisting of polymeric material such as polyethylene, polypropylene or any other suitable food grade inert plastic. Each external surface of the support layer is preferably surrounded by a portion of net. For instance, the nets can be placed adjacent the support layers and rolled out to obtain a cylindrical shape and then be placed into the cylindrical cartridge. The nets are oriented with the open cells directed transversally therefore to favor the flow in transverse or tangential direction and block the flow in longitudinal direction. The nets thus maintain water turbulence, providing increased contacts between water and metal particulate and eventually polyphosphates. The size of the holes in the net can range from 0.1 to 10 mm, preferably 1–5 mm and most preferably 2 to 3 mm. Other suitable material can replace the net structure providing similar unidirectional flow effect such as a honeycomb and the like.

EXAMPLES

The following examples illustrate preferred embodiments of the invention.

Example 1

Performance of Beverage Dispenser with Water Treated by Zinc and Copper Particulate Alone To help solve equipment performance issues due to scale formation during water heating, water treatment with metal particulates was used. The particular material is KDF-55® powder, where KDF-55® is the brand name of a granular medium made of pure, lead-free brass commercialized by KDF Fluid Treatment (U.S.A.).

Water Treatment Cartridges comprising of 50% Cu and 50% Zn were used in the test. The cartridges were designed to get at least 1 gal/min water flow rate using tap water pressure.

A prototype beverage dispenser including a treating cartridge is schematically illustrated in FIG. 1.

The permanent water hardness was ca 250 ppm as calcium carbonate, and pH was 7.6.

Figure 5:
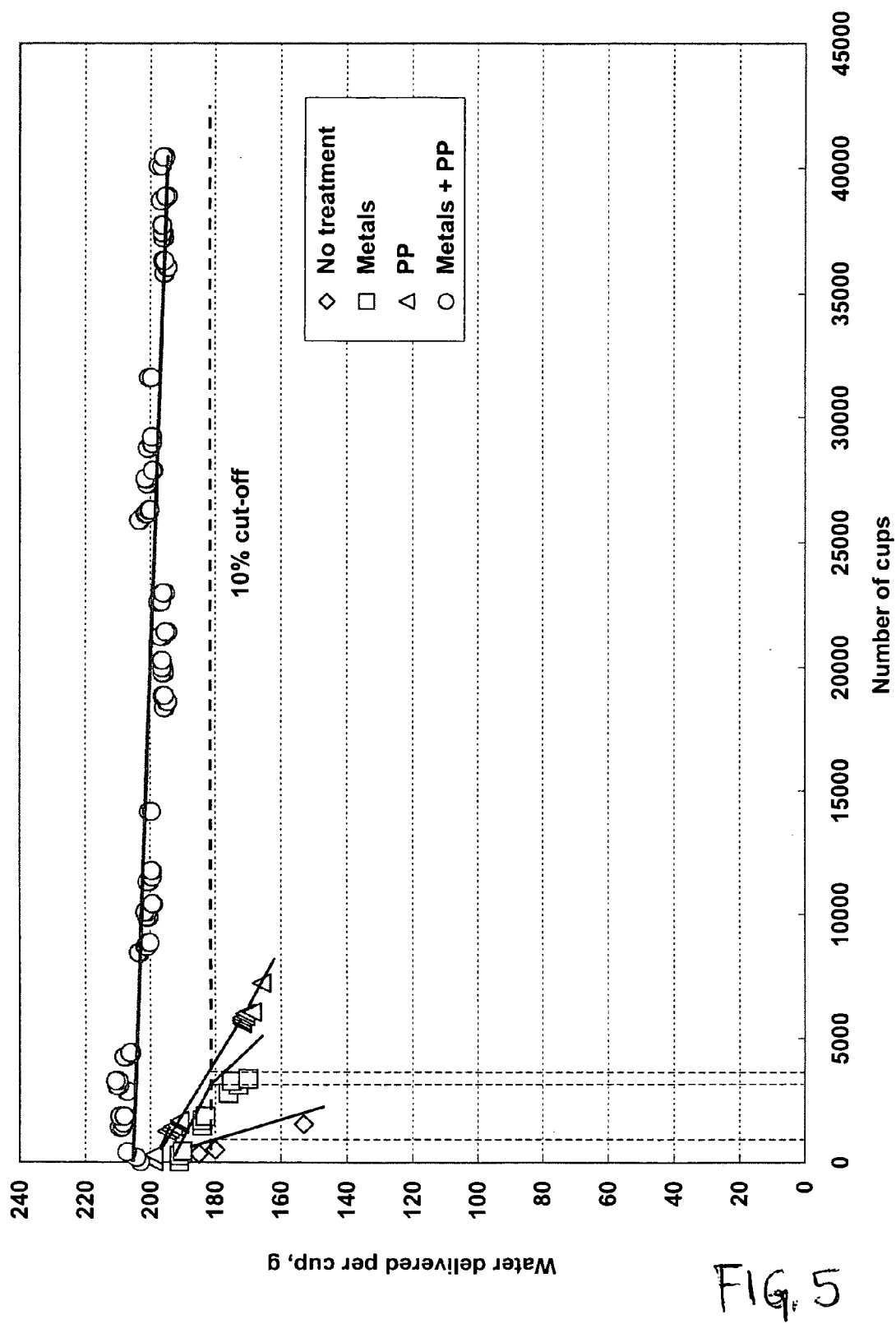
FIG. 5 is a graph that illustrates the performance of the prototype dispenser and water treatment cartridge of FIG. 1.

As shown in FIG. 5, the performance of the prototype dispenser with the cartridge was improved by 4 times, i.e. number of servings (until there was a 10% decrease in amount of water delivered per cup) was about 800 and 3,300 for machine with and without the metal particulates water treatment cartridge, respectively.

The main scale build-up was found in the hot water delivery solenoid valve.

Example 2

Performance of Beverage Dispenser with Water Treated by Polyphosphates Alone

Commercial polyphosphate cartridges were used in the test. The cartridges provide a minimum of at least 1 gal/min water flow rate using tap water pressure.

The same dispenser and treating cartridge were used as in Example 1.

The permanent water hardness was ca 250 ppm as calcium carbonate, and pH was 7.6.

As shown in FIG. 3, the performance of the prototype dispenser with the polyphosphate cartridge was improved by about 4 times (which is similar to that for the metal particulate water treatment).

Example 3

Performance of a Beverage Dispenser with Water Treated by Metal Particulates and Polyphosphates The same prototype beverage dispenser was evaluated on its performance using a combination of both metal particulates (zinc and copper) and polyphosphate containing cartridges.

To be treated, raw water was passed through a set of cartridges, first through a commercial cylindrical polyphosphate unit placed in the water feed line to the machine and then through a metal particulates cartridge of the type referenced in Example 1.

Water samples were collected every about 1,000 cycles for mineral analyses. Results showed that levels of zinc (about 1.0 ppm) and copper (about 0.05 ppm) ions released into treated water were within the preferred range.

Water treatment with a combination of polyphosphate and metal particulates (i.e., zinc and copper) improved the dispenser performance of more than 50 times. The amount of water delivered remained above 90% of the target quantity, and water temperature was stable for more than 40,000 cups.

The combination did not stop scale from forming, but seems to cause a different type of crystal to form. This different type of scale did not adhere well to surfaces and instead of a hard scale building up, it formed a loose non-adhering powder, most of which tended to be carried out of the system with the water stream. As compared to metals ions or polyphosphates released alone, the combination of both metal ions release and polyphosphates brought significant improvements, probably due to the synergetic effect of the combination on adherent properties of scale.

What is claimed is:

1. A method for treating water to reduce limestone scale deposit in high cycle food or beverage dispensing systems which comprises passing water through metal particulates and polyphosphates before heating to reduce scale deposits in heated water contacted portions of such systems, by forming a crystal or scale that does not adhere well to surfaces, and wherein the metal particulates include zinc, copper, iron, magnesium, manganese, tin or a mixture or alloy thereof, and the metal particulates and polyphosphates are present in a weight ratio of from 95:5 to 5:95.

2. The method according to claim 1, wherein the metal particulates comprise an alloy or mixture of zinc and at least one other metal.

3. The method according to claim 2, wherein the other metal has a higher standard electrode potential.

4. The method according to claim 3, wherein the metal particulates comprise an alloy or mixture of zinc and copper.

5. The method according to claim 3, wherein the metal particulates include zinc in an amount effective to deliver of 0.2 to 20 ppm in water and the polyphosphates being present in an amount effective to release 1 to 10 ppm in water.

6. The method according to claim 1, wherein the cartridge comprises polyphosphates in an amount effective to deliver from 1 to 10 ppm.

7. The method according to claim 1, wherein the metal particulates and polyphosphates are present in a weight ratio of metal particulates to polyphosphates of from 2:1 to 5.5:1.

8. The method according to claim 1, wherein polyphosphates comprise a salt or acid of a polyphosphate, a polymetaphosphate, a pyrophosphate, a phosphonate or a combination thereof.

9. The method according to claim 1, wherein the metal particulates and polyphosphates are combined to form a water permeable bed.

10. The method according to claim 9, wherein the metal particulates have a particle size of from 20 to 10,000 micrometers.

11. The method according to claim 10, wherein the metal particulates have a particle size of from 100 to 3,000 micrometers.

12. The method according to claim 1, wherein the metal particulates and polyphosphates are present in adjacent layers.

13. The method according to claim 1, wherein the metal particulates are immobilized in a composite cartridge assembly.

14. The method according to claim 1, wherein the metal particulates and polyphosphates are both immobilized in a composite filtering assembly.

15. The method according to claim 1, wherein the metal particulates and polyphosphates are contained in a cartridge comprising an inlet for non-treated water to enter the cartridge and an outlet for treated water to exit the cartridge.

16. The method according to claim 1, wherein the water is passed through the metal particulate and polyphosphates while tepid, ambient or cold and then is heated in a heater after passing therethrough.

17. The method of claim 1, wherein the water-contacted portions of the high cycle dispensing systems includes internal surfaces or heating elements.

* * * * *